UNITED STATES PATENT OFFICE.

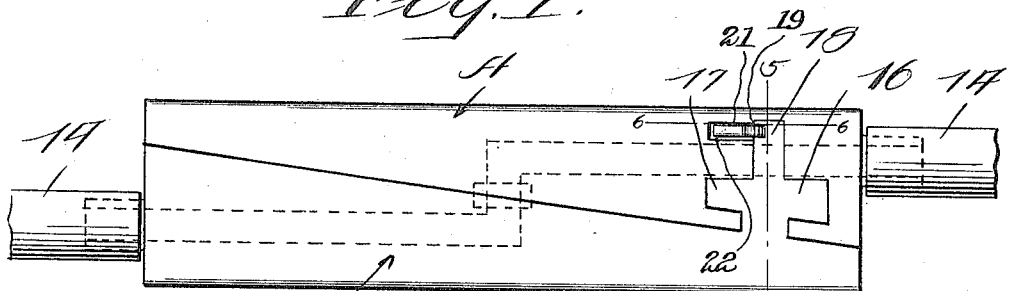
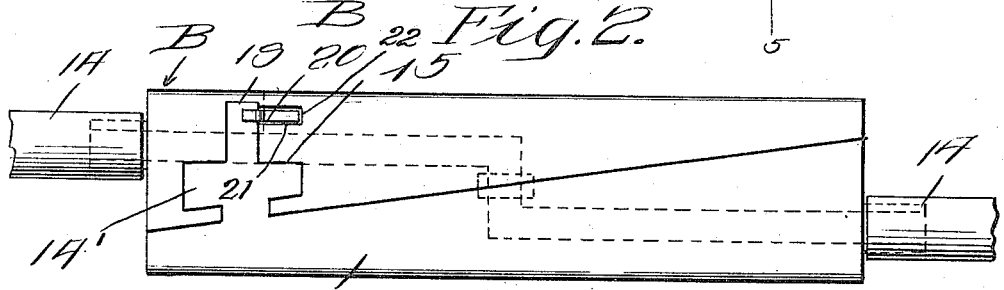
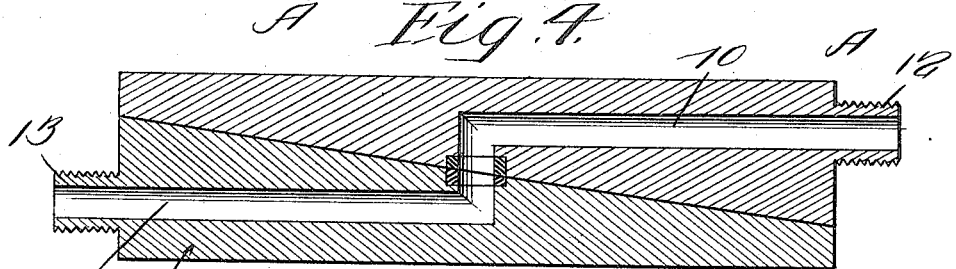
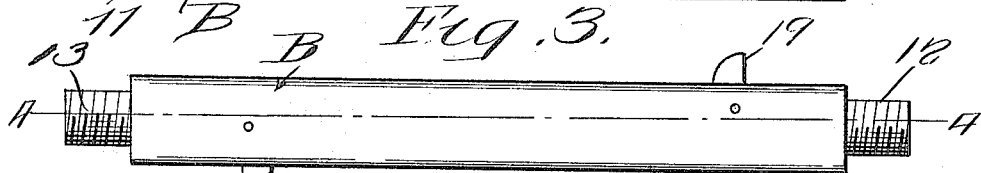
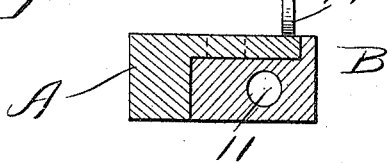

WILLIAM ENGLE, OF TAYLOR, WASHINGTON.

AIR-HOSE COUPLING.

1,161,641.     Specification of Letters Patent.     Patented Nov. 23, 1915.

Application filed July 9, 1913. Serial No. 778,095.

*To all whom it may concern:*

Be it known that I, WILLIAM ENGLE, a citizen of the United States, residing at Taylor, in the county of King, State of Washington, have invented certain new and useful Improvements in Air-Hose Couplings; and I do hereby declare the following to be a full, clear, and exact description of the invention, such as will enable others skilled in the art to which it appertains to make and use the same.

This invention relates to air hose couplings.

The object of the invention resides in the provision of an air hose coupling whereby the terminals of the air hose of adjacent railway cars may be easily and quickly connected and detached.

A further object of the invention resides in the provision of a coupling of the character named which will be simple in construction, easily operated, efficient in use and which may be manufactured and installed at a comparatively small cost.

With the above and other objects in view the invention consists in the detail of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of an air hose coupling constructed in accordance with the invention; Fig. 2, a bottom view of what is shown in Fig. 1; Fig. 3, a side view of what is shown in Fig. 1; Fig. 4, a section on the line 4—4 of Fig. 3; Fig. 5, a section on the line 5—5 of Fig. 1, and Fig. 6, a section on the line 6—6 of Fig. 1.

Referring to the drawings the coupling is shown as comprising heads A and B arranged side to side with their abutting faces beveled and said heads being provided respectively with passages 10 and 11, the inner ends of which latter open through the abutting sides of the heads and are disposed in registration, while the outer ends of said passages open through opposite ends of the heads respectively. The heads A and B are provided at opposite ends with threaded nipples 12 and 13 respectively whereby said heads may be connected with air hose terminals 14 with the latter in communication with respective passages 10 and 11.

The head A is provided on its lower side with a T-shaped lateral projection 14' which seats in a recess 15 formed in the lower side of the head B. Formed on the upper side of the head B is a T-shaped lateral projection 16 which seats in a recess 17 formed in the upper side of the head A. This interlocking engagement between the head A and B serves to hold same against movement away from each other in one direction. Formed by an extension of each member 14' is a finger 18 which overlies the opposite head and coöperates with a latch device mounted on said opposite head. Each of these latch devices is shown as comprising pivoted angle members 19 and 20 which coöperate respectively with springs 21 seated in recesses 22 formed in the heads A and B respectively. These springs 21 constantly tend to hold the latch devices in locking position as will be obvious. It will be noted that by pressing on the inner end of the angle members 19 and 20 the upper ends of said members can be moved apart so as to release the fingers 18 to permit the heads A and B to be detached one from the other.

In securing the heads A and B together said heads are placed at an angle to each other with the central portion of their abutting faces in engagement. The heads are then rotated into the same plane with their central engaging portions as a pivot when the fingers 18 will engage the angle members 19 and 20 respectively and move the latter against the influence of the springs 21. When the fingers 18 have passed the nibs on the angle members the springs 21 will operate to pivot the angle members and dispose the nibs thereon in overlying relation to respective fingers 18.

What I claim is:—

An air hose coupling comprising a pair of heads disposed side to side and tapering longitudinally in opposite directions and provided respectively with passages having their inner ends opening through abutting sides of the heads and disposed in registration, and their outer ends opening through opposite ends of the heads, means for attaching the air hose in communication with the outer end of each passage, said heads having T-shaped recesses in the tops and bottoms of their major ends respectively and opening through their inner side, T-shaped lateral projections carried by said heads respectively at the top and bottom of their minor ends, and adapted to seat in said recesses when said heads are locked together, and latch devices carried by respective heads and adapted to detachably secure said projections against disengagement from said recesses.

In testimony whereof, I affix my signature, in the presence of two witnesses.

WILLIAM ENGLE.

Witnesses:
E. J. GOODNEILL,
J. D. MILLER.

Copies of this patent may be obtained for five cents each, by addressing the "Commissioner of Patents, Washington, D. C."